(12) United States Patent
Yeh et al.

(10) Patent No.: US 10,429,956 B2
(45) Date of Patent: Oct. 1, 2019

(54) CAPACITIVE STYLUS WITH DETACHABLE ERASER

(71) Applicant: WALTOP INTERNATIONAL CORPORATION, Hsinchu (TW)

(72) Inventors: Chia-Jui Yeh, Taipei (TW); Yi-Chih Chang, Hsinchu (TW)

(73) Assignee: Waltop International Corporation, Hsinchu (TW)

( * ) Notice: Subject to any disclaimer, the term of this patent is extended or adjusted under 35 U.S.C. 154(b) by 0 days.

(21) Appl. No.: 16/052,440

(22) Filed: Aug. 1, 2018

(65) Prior Publication Data

US 2019/0056806 A1  Feb. 21, 2019

(30) Foreign Application Priority Data

Aug. 18, 2017 (TW) .............................. 106128091 A

(51) Int. Cl.
*G06F 3/0354* (2013.01)
*G06F 3/038* (2013.01)
*G06F 3/045* (2006.01)

(52) U.S. Cl.
CPC ........ *G06F 3/03545* (2013.01); *G06F 3/0383* (2013.01); *G06F 3/045* (2013.01)

(58) Field of Classification Search
CPC ..... G06F 3/03545; G06F 3/0383; G06F 3/045
See application file for complete search history.

(56) References Cited

U.S. PATENT DOCUMENTS

| | | | |
|---|---|---|---|
| 9,639,182 B1 * | 5/2017 | Tang | G06F 3/0383 |
| 2016/0274682 A1 * | 9/2016 | Yebka | G06F 3/03545 |
| 2017/0068342 A1 * | 3/2017 | Zimmerman | G06F 3/0383 |
| 2017/0322643 A1 * | 11/2017 | Eguchi | G06F 3/044 |

* cited by examiner

*Primary Examiner* — Andrew Sasinowski
(74) *Attorney, Agent, or Firm* — Donald E. Stout; Stout, Uxa & Buyan, LLP

(57) ABSTRACT

This invention discloses a capacitive stylus including a pen housing and a detachable eraser. The pen housing comprises a rear end section and a thinning section with a thinner wall thickness than that of the rear end section. A compressible latch is disposed at the outer surface of the eraser. The rear end section includes an axial groove. By pushing the latch to pass through the axial groove into the thinning section and rotating the latch within the thinning section, the pen housing is combined with the eraser.

8 Claims, 6 Drawing Sheets

CAPACITIVE STYLUS WITH DETACHABLE ERASER

CROSS-REFERENCE TO RELATED APPLICATIONS

The entire contents of Taiwan Patent Application No. 106128091, filed on Aug. 18, 2017, from which this application claims priority, are herein expressly incorporated herein by reference.

BACKGROUND OF THE INVENTION

1. Field of the Invention

The present invention relates to a handwriting input system, and more particularly relates to a capacitive stylus having a detachable eraser.

2. Description of Related Art

A digitizer system typically includes a tablet and a stylus. The user places the tip of the stylus on or near a sensing surface of the tablet, and the tablet tracks the position change of the tip on the sensing surface and interprets it as an instruction or forms a stroke.

A capacitive input pen with an erasing function is more convenient for the consumer to use. For example, the input content can be corrected by erasing.

SUMMARY OF THE INVENTION

In one general aspect, the present invention relates to a capacitive stylus having a detachable eraser.

According to an aspect of this invention, a capacitive stylus is provided for being used on a touch device and comprises a pen housing and an eraser. The pen housing comprises a rear end section and a thinning section. The thinning section is located before the rear end section, and the thickness of the rear end section is greater than the thickness of the thinning section. The eraser is located at a rear end of the pen housing for emitting an erasing signal. The outer surface of the eraser includes a compressible latch, an inner surface of the rear end section includes an axial groove, and the latch is pushed through the axial groove to locate the latch in the thinning section, and the latch is rotated in the thinning section to complete the assembly with the pen housing.

In one embodiment, the rear end section of the pen housing comprises a positioning groove, the eraser comprises a sleeve, and an edge of the sleeve comprises a protrusion, and when the latch passes through the axial groove, the protrusion is stopped by the positioning groove and is against a first end of the positioning groove.

In one embodiment, the latch is rotated in the thinning section to move the protrusion from the first end of the positioning groove to a second end of the positioning groove.

In one embodiment, the pen housing comprises an outer cutting plane, the sleeve comprises an alignment plane, and when the eraser is assembled with the pen housing, the outer cutting plane is aligned with the alignment plane to form a complete flat cutting plane.

In one embodiment, wherein the eraser further comprises a plurality of elastic shrapnels, and the inner wall of the pen housing comprises a plurality of contacts corresponding to the plurality of elastic shrapnels, and when the eraser is assembled with the pen housing, the plurality of elastic shrapnels are respectively in contact with the plurality of contacts.

In one embodiment, the pen housing further comprises a control circuit, and the plurality of contacts are electrically connected to the control circuit.

In one embodiment, the pen housing further comprises a battery or an electrode, and the front end of the eraser comprises a contact electrode, and when the eraser is assembled with the pen housing, the contact electrode is in contact with the battery or electrode.

In one embodiment, the pen housing further comprises a control circuit, and the battery or the electrode is electrically connected to the control circuit.

DETAILED DESCRIPTION OF THE PREFERRED EMBODIMENT

Figure 1:
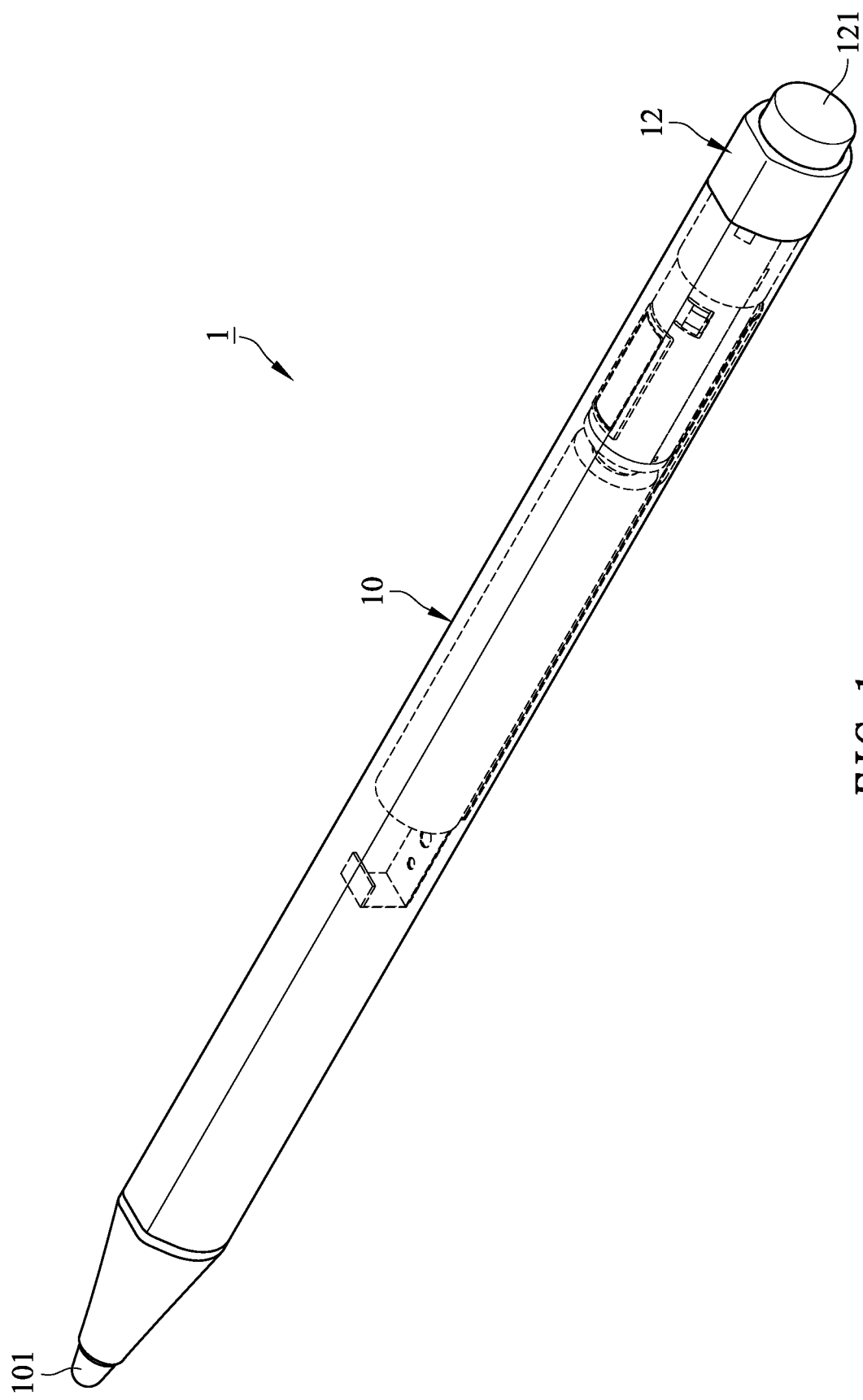
FIG. 1 is a perspective view showing a capacitive stylus with a detachable eraser in accordance with a preferred embodiment of the present invention.

Embodiments of the invention are now described and illustrated in the accompanying drawings, instances of which are to be interpreted to be to scale in some implementations while in other implementations, for each instance, not. In certain aspects, use of like or the same reference designators in the drawings and description refers to the same, similar or analogous components and/or elements, while according to other implementations the same use should not. According to certain implementations, use of directional terms, such as, top, bottom, left, right, up, down, over, above, below, beneath, rear, front, clockwise, and counterclockwise, are to be construed literally, while in other implementations the same use should not. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations and components are not described in detail in order not to unnecessarily obscure the present invention. While drawings are illustrated in detail, it is appreciated that the quantity of the disclosed components may be greater or less than that disclosed, except where expressly restricting the amount of the components.

Figure 2:
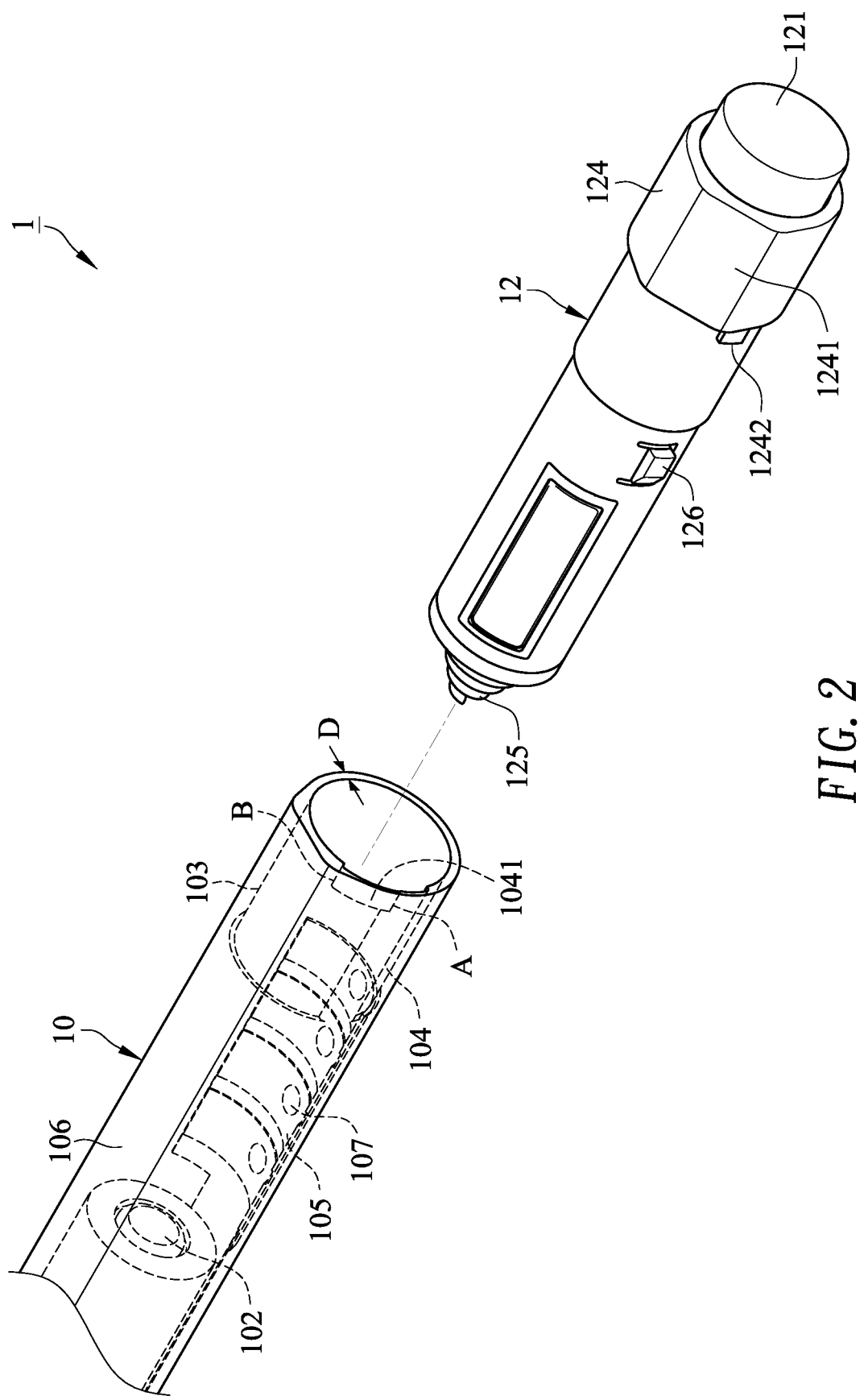
FIG. 2 is a partially perspective view showing the capacitive stylus with the detachable eraser in accordance with the preferred embodiment of the present invention.
Figure 3:
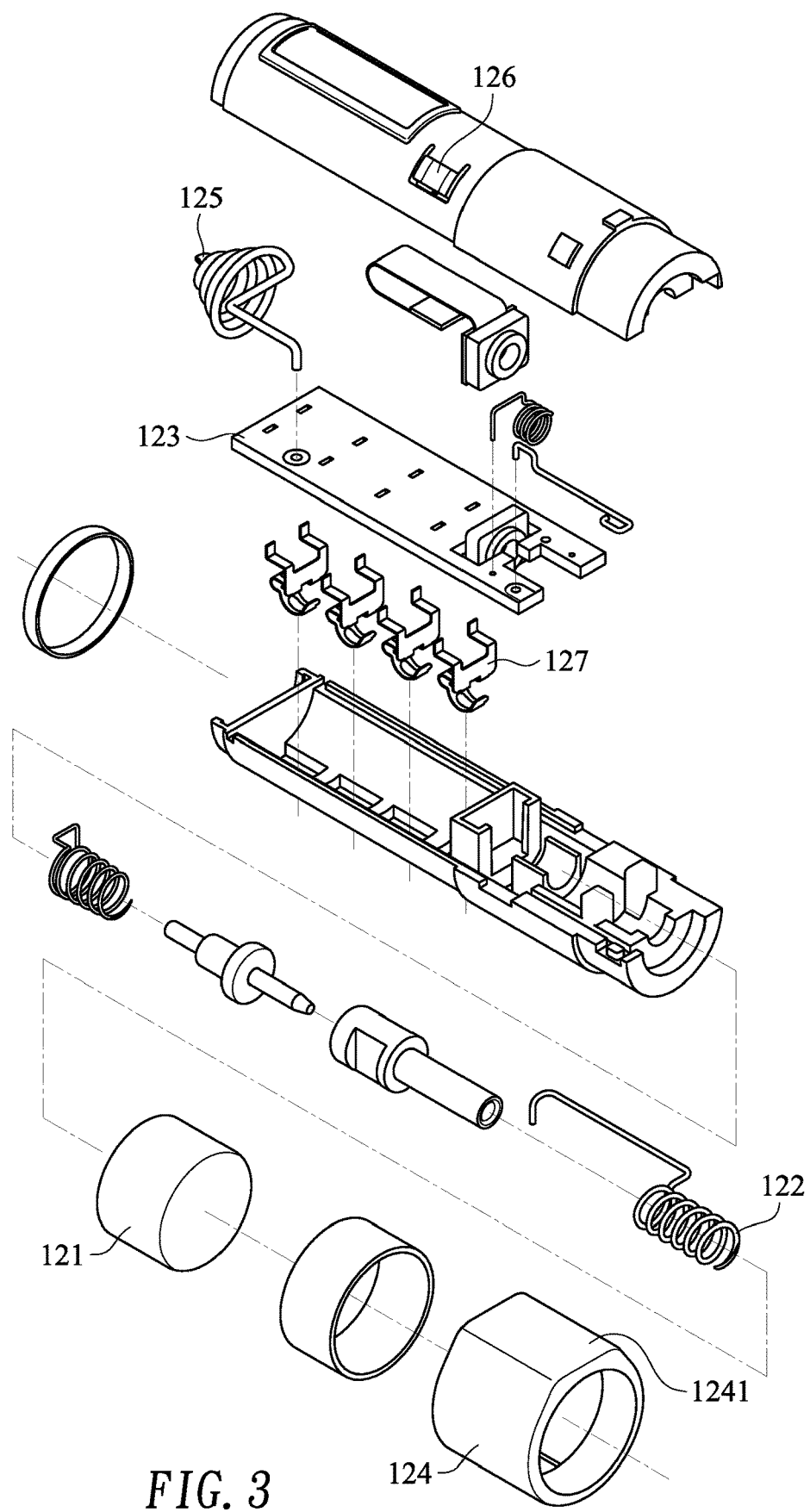
FIG. 3 is an exploded view showing the capacitive stylus with the detachable eraser in accordance with the preferred embodiment of the present invention.

FIGS. 1, 2, and 3 are perspective view, partial perspective view, and exploded view, showing a capacitive stylus 1 having a detachable eraser in accordance with a preferred embodiment of the present invention. In this embodiment, the capacitive stylus 1 is applied to a touch device (not shown) such as a mobile touch device including a mobile phone or a tablet computer. The touch device may include a touch screen or in-cell sensing elements that can sense the touch positions touched by the user. In one embodiment, the touch screen is a capacitive touch screen, but is not limited thereto.

Referring to FIGS. 1 to 3, the capacitive stylus 1 includes a pen housing 10 and a detachable eraser 12. The pen housing 10 itself can be used as a general capacitive input pen. The front end of the pen housing 10 has a tip 101 through which the user can write on the screen of the touch device. A control circuit (not shown) is disposed within the pen housing 10, and the control circuit transmits signals through the tip 101 or other electrode elements. The touch device receives the signals and performs functions corresponding to the signals.

Referring to FIG. 1 to FIG. 3, the pen housing 10 includes a battery 102 (or an electrode 102) electrically connected to the control circuit of the capacitive stylus 1. The front end of the eraser 12 includes a contact electrode 125. When the pen housing 10 is combined with the eraser 12, the contact electrode 125 is in contact with the battery 102 (or the electrode 102), causing that the eraser 12 electrically connects the battery 102 and/or the control circuit of the capacitive stylus 1. In addition, the terminal of the eraser 12 includes a tail cap 121 having an emission electrode 122 therein. When the pen housing 10 is combined with the eraser 12 and the tail cap 121 of the eraser 12 is pressed (for example, the user touches the screen of the touch device with the tail cap 121 of the eraser 12), the capacitive stylus 1 transmits an erasing signal through the emission electrode 122 and the touch device receives the erasing signal and performs an erasing function. It should be noted that the contact electrode 125 and the emission electrode 122 are both components of an erasing circuit of the eraser 12, and the erasing circuit may further include other components. Those components may not key features of the present invention and therefore will not be mentioned.

FIG. 4A to 4D are perspective views showing a method of assembling the eraser 12 and the pen housing 10 of the capacitive stylus 1 according to the preferred embodiment of the present invention.

Figure 4A:
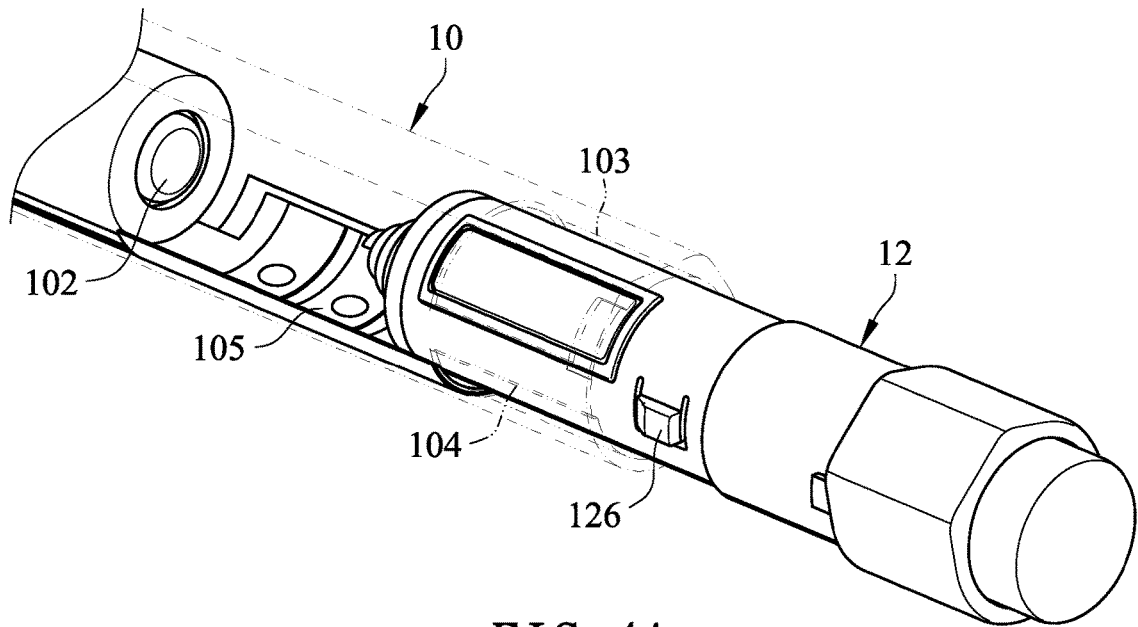
FIGS. 4A-4D are perspective views showing a method to assemble a pen housing and the detachable eraser of the capacitive stylus in accordance with the preferred embodiment of the present invention.

Referring to FIG. 2, FIG. 3, and FIG. 4A, the outer surface of the eraser 12 is provided with a latch 126 protruding from the surface of the eraser 12, and the inside of latch 126 may have a spring or an elastic member (not shown), so that the latch 126 can be pressed to reduce its height to be the same as the height of the outer surface of the eraser 12 (i.e., to be not protruded). The rear end of the pen housing 10 includes a rear end section 103 and a thinning section 105, and the thinning section 105 is located before the rear end section 103. The thickness D of the rear end section 103 is greater than the thickness of the thinning section 105. The rear end section 103 has an axial groove 104 axially disposed on the inner surface of the rear end section 103.

As shown in FIG. 2, FIG. 3, and FIG. 4A, the eraser 12 includes a sleeve 124. When the eraser 12 is needed to be assembled with the pen housing 10, the user can hold the sleeve 124 and rotate the eraser 12 to align the latch 126 of eraser 12 with the axial groove 104 of the pen housing 10.

Figure 4B:
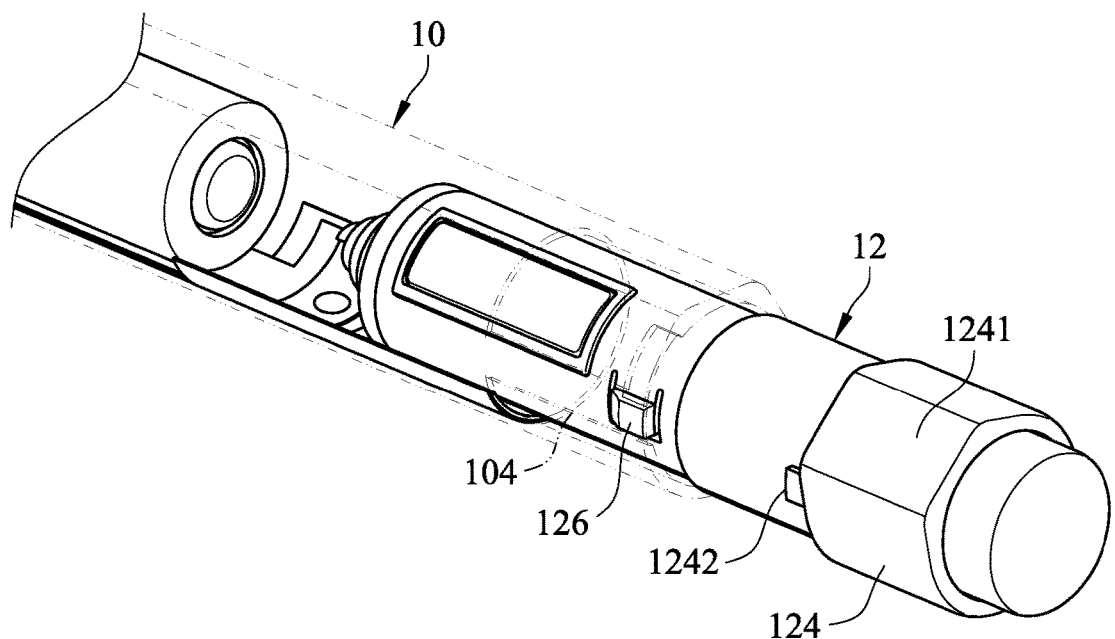

Referring to FIG. 2, FIG. 3, and FIG. 4B, the user then holds the eraser 12 to push the latch 126 of the eraser 12 forward along the axial groove 104. At this time, the protruded height of the latch 126 is suppressed by the wall of the rear end section 103 and does not affect the advancement of the eraser 12. At this time, an alignment plane 1241 of the sleeve 124 is not aligned with an outer cutting plane 106 of the pen housing 10.

Figure 4C:
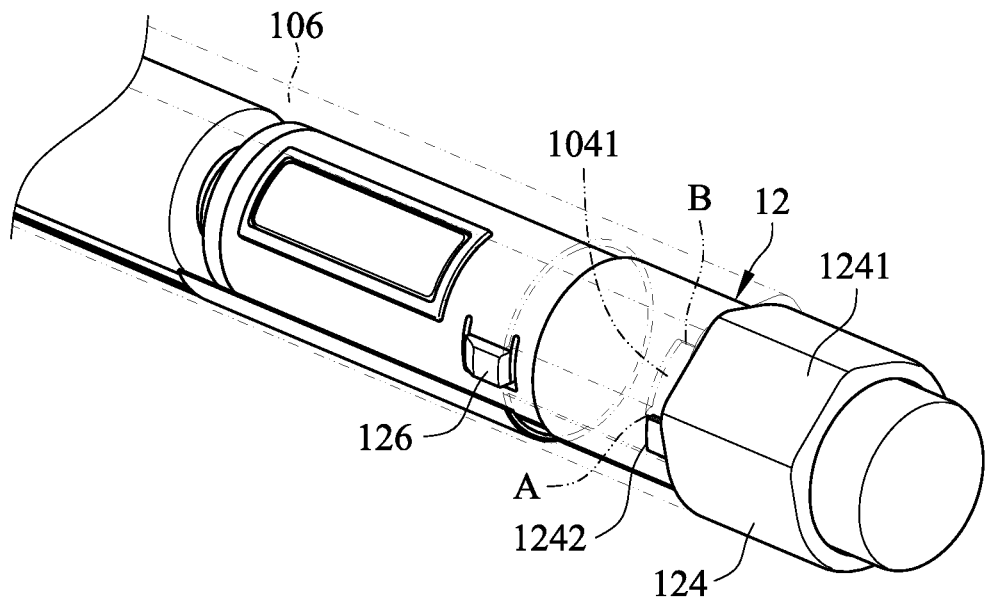

Referring to FIG. 2, FIG. 3, and FIG. 4C, then, as the latch 126 continues to be pushed forward along the axial groove 104, the latch 126 passes through the rear end section 103 and is positioned in the thinning section 105. The edge of the sleeve 124 has a protrusion 1242, and the rear end section 103 of the pen housing 10 has a positioning groove 1041. At this time, the protrusion 1242 is stopped by the positioning groove 1041 and is against a first end A of the positioning groove 1041, so that the eraser 12 cannot continue to advance.

Figure 4D:
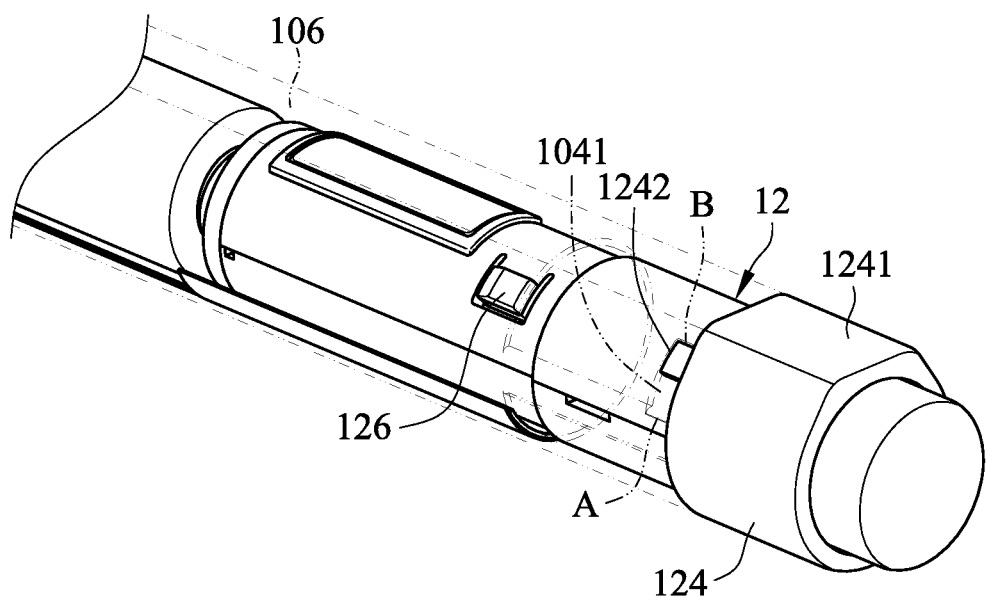

Referring to FIG. 2, FIG. 3, FIG. 4D, the user then holds the eraser 12 to rotate, for example, in a clockwise direction, so that the protrusion 1242 is moved from the first end A to the second end B of the positioning groove 1041. At this time, the eraser 12 can no longer be rotated, and due to the difference in thickness between the rear end section 103 and the thinning section 105, the latch 126 is stuck by the rear end section 103, so that the eraser 12 cannot be axially withdrawn out of the pen housing 10, and the assembly of the eraser 12 and the pen housing 10 is completed. After the assembly is complete, the alignment plane 1241 of the sleeve 124 is aligned with the outer cutting plane 106 of the pen housing 10 to form a complete flat cutting plane.

When the eraser 12 is needed to be removed, the reverse steps described above, i.e., the steps in the order of FIGS. 4D, 4C, 4B, 4A, are performed to withdraw the eraser 12 out of the pen housing 10.

Figure 5A:
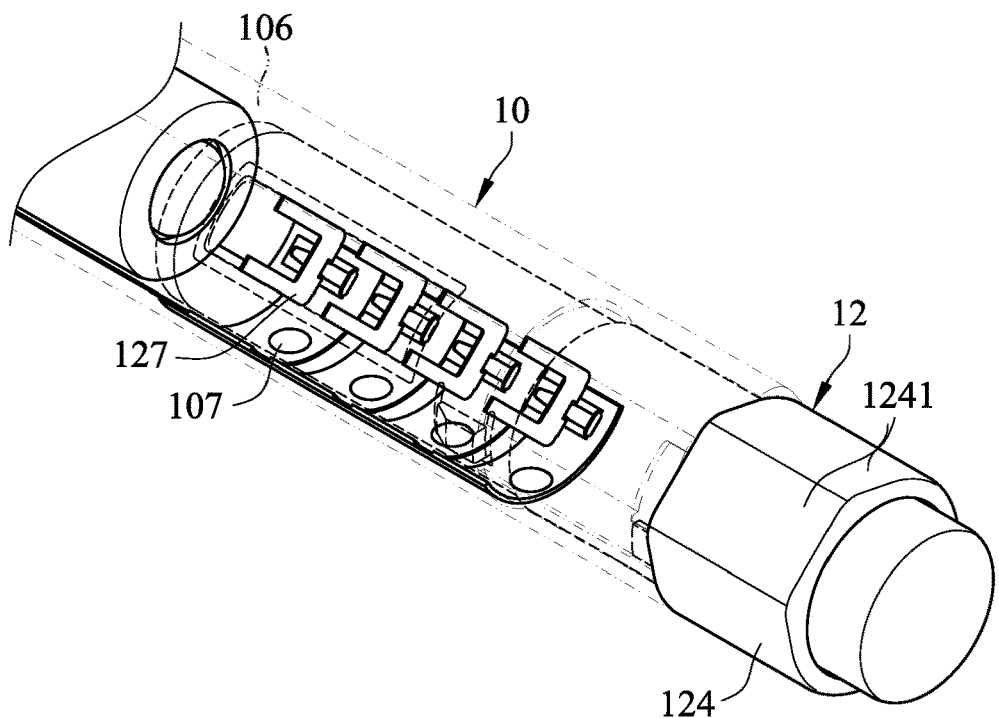
FIGS. 5A and 5B are perspective views showing the assembly of the pen housing and the detachable eraser of the capacitive stylus in accordance with the preferred embodiment of the present invention.
Figure 5B:
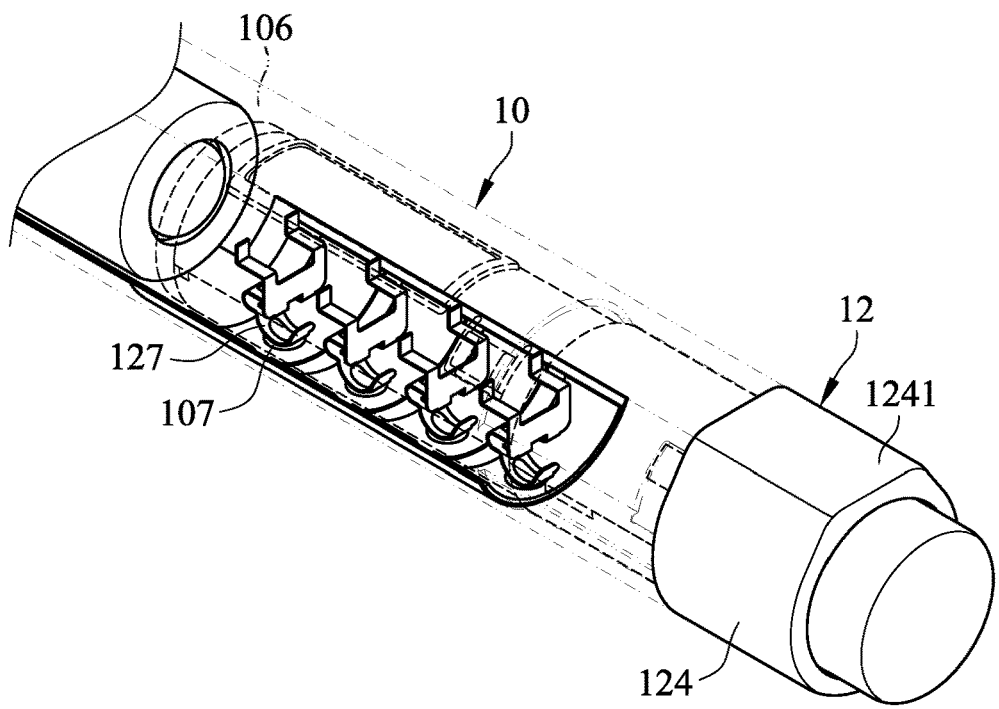

FIG. 5A and FIG. 5B are perspective views showing the assembly of the pen housing 10 and the eraser 12 of the capacitive stylus 1 in accordance with a preferred embodiment of the present invention. In the preferred embodiment, the erasing circuit of the eraser 12 further includes a plurality of elastic shrapnels 127, for example, four elastic shrapnels 127. The inner wall of the pen housing 10 has a corresponding number of contacts 107, for example, four contacts 107. As shown in FIG. 5A, when the pen housing 10 and the eraser 12 are not assembled, that is, the alignment plane 1241 of the sleeve 124 is not aligned with the outer cutting plane 106 of the pen housing 10, the terminals of the elastic shrapnels 127 are not in contact with the contacts 107. The terminal of the shrapnel 127 protrudes from the opening of the circuit board 123 (FIG. 3). As shown in FIG. 5B, when the pen housing 10 and the eraser 12 are assembled, that is, the alignment plane 1241 of the sleeve 124 is aligned with the outer cutting plane 106 of the pen housing 10, each terminal of the elastic shrapnels 127 just contacts one corresponding contact 107. The contact 107 can be electrically connected to the control circuit (not shown) of the pen housing 10.

According to the capacitive stylus 1 with a detachable eraser provided by the embodiment of the present invention, the user can conveniently disassemble the eraser 12 for performing other operations, such as, but not limited to, replacing battery of the pen hosing 10.

The intent accompanying this disclosure is to have each/all embodiments construed in conjunction with the knowledge of one skilled in the art to cover all modifications, variations, combinations, permutations, omissions, substitutions, alternatives, and equivalents of the embodiments, to the extent not mutually exclusive, as may fall within the spirit and scope of the invention. Corresponding or related structure and methods disclosed or referenced herein, and/or in any and all co-pending, abandoned or patented application(s) by any of the named inventor(s) or assignee(s) of this application and invention, are incorporated herein by reference in their entireties, wherein such incorporation includes corresponding or related structure (and modifications thereof) which may be, in whole or in part, (i) operable and/or constructed with, (ii) modified by one skilled in the art to be operable and/or constructed with, and/or (iii) implemented/made/used with or in combination with, any part(s) of the present invention according to this disclosure, that of the application and references cited therein, and the knowledge and judgment of one skilled in the art.

Conditional language, such as, among others, "can," "could," "might," or "may," unless specifically stated otherwise, or otherwise understood within the context as used, is generally intended to convey that embodiments include, and in other interpretations do not include, certain features, elements and/or steps. Thus, such conditional language is not generally intended to imply that features, elements and/or steps are in any way required for one or more embodiments, or interpretations thereof, or that one or more embodiments necessarily include logic for deciding, with or without user input or prompting, whether these features, elements and/or steps are included or are to be performed in any particular embodiment.

All of the contents of the preceding documents are incorporated herein by reference in their entireties. Although the disclosure herein refers to certain illustrated embodiments, it is to be understood that these embodiments have been presented by way of example rather than limitation. For example, any of the particulars or features set out or referenced herein, or other features, including method steps and techniques, may be used with any other structure(s) and process described or referenced herein, in whole or in part, in any combination or permutation as a non-equivalent, separate, non-interchangeable aspect of this invention. Corresponding or related structure and methods specifically contemplated and disclosed herein as part of this invention, to the extent not mutually inconsistent as will be apparent from the context, this specification, and the knowledge of one skilled in the art, including, modifications thereto, which may be, in whole or in part, (i) operable and/or constructed with, (ii) modified by one skilled in the art to be operable and/or constructed with, and/or (iii) implemented/made/ used with or in combination with, any parts of the present invention according to this disclosure, include: (I) any one or more parts of the above disclosed or referenced structure and methods and/or (II) subject matter of any one or more of the inventive concepts set forth herein and parts thereof, in any permutation and/or combination, include the subject matter of any one or more of the mentioned features and aspects, in any permutation and/or combination.

Although specific embodiments have been illustrated and described, it will be appreciated by those skilled in the art that various modifications may be made without departing from the scope of the present invention, which is intended to be limited solely by the appended claims.

What is claimed is:

1. A capacitive stylus used on a touch device, comprising:
a pen housing comprising a rear end section and a thinning section, the thinning section being located before the rear end section, the rear end section having a thickness greater than a thickness of the thinning section;
a detachable eraser located at a rear end of the pen housing for emitting an erasing signal;
wherein an outer surface of the eraser includes a compressible latch, an inner surface of the rear end section includes an axial groove, and the latch is pushed through the axial groove to locate the latch in the thinning section, and the latch is rotated in the thinning section to complete the assembly with the pen housing.

2. The capacitive stylus as recited in claim 1, wherein the rear end section of the pen housing comprises a positioning groove, the eraser comprises a sleeve, and an edge of the sleeve comprises a protrusion, and when the latch passes through the axial groove, the protrusion is stopped by the positioning groove and is against a first end of the positioning groove.

3. The capacitive stylus as recited in claim 2, wherein the latch is rotated in the thinning section to move the protrusion from the first end of the positioning groove to a second end of the positioning groove.

4. The capacitive stylus as recited in claim 1, wherein the pen housing comprises an outer cutting plane, the sleeve comprises an alignment plane, and when the eraser is assembled with the pen housing, the outer cutting plane is aligned with the alignment plane to form a complete flat cutting plane.

5. The capacitive stylus as recited in claim 1, wherein the eraser further comprises a plurality of elastic shrapnels, and the inner wall of the pen housing comprises a plurality of contacts corresponding to the plurality of elastic shrapnels, and when the eraser is assembled with the pen housing, the plurality of elastic shrapnels are respectively in contact with the plurality of contacts.

6. The capacitive stylus as recited in claim 5, wherein the pen housing further comprises a control circuit, and the plurality of contacts electrically connect to the control circuit.

7. The capacitive stylus as recited in claim 1, wherein the pen housing further comprises a battery or an electrode, and the front end of the eraser comprises a contact electrode, and when the eraser is assembled with the pen housing, the contact electrode is in contact with the battery or the electrode.

8. The capacitive stylus as recited in claim 7, wherein the pen housing further comprises a control circuit, and the battery or the electrode is electrically connected to the control circuit.

* * * * *